United States Patent
Chhabra et al.

(10) Patent No.: US 8,954,045 B2
(45) Date of Patent: Feb. 10, 2015

(54) METHOD AND APPARATUS FOR MANAGING RESOURCES AT A WIRELESS DEVICE

(75) Inventors: Gurvinder Chhabra, San Diego, CA (US); Idreas Mir, San Diego, CA (US); Thomas Klingenbrunn, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 867 days.

(21) Appl. No.: 11/862,960

(22) Filed: Sep. 27, 2007

(65) Prior Publication Data

US 2008/0085717 A1   Apr. 10, 2008

Related U.S. Application Data

(60) Provisional application No. 60/827,678, filed on Sep. 29, 2006.

(51) Int. Cl.
*H04M 3/00* (2006.01)
*H04B 17/00* (2006.01)
(Continued)

(52) U.S. Cl.
CPC ............. *G06F 9/5011* (2013.01); *H04L 47/10* (2013.01); *H04L 5/1446* (2013.01); *H04W 28/12* (2013.01); *H04M 11/066* (2013.01)
USPC .......................... 455/418; 370/236; 455/67.11

(58) Field of Classification Search
CPC .. H04W 28/12; H04M 11/066; H04L 5/1446; H04L 47/10; G06F 9/5011
USPC .......... 713/300, 322, 500, 501, 600; 710/240; 370/395.21, 395.42, 236; 455/418, 455/419, 420, 450–453, 67.11
See application file for complete search history.

(56) References Cited

U.S. PATENT DOCUMENTS 5,751,959 A    5/1998    Sato et al.
5,774,704 A *  6/1998    Williams ...................... 713/501
(Continued)

FOREIGN PATENT DOCUMENTS

CN    1404697 A    3/2003
CN    1496157 A    5/2004
(Continued)

OTHER PUBLICATIONS

International Business Machines Corporation: "Method to throttle resource communication via artificial CPU consumption" Research Disclosure, Mason Publications, Hampshire, GB, vol. 449, No. 78, Sep. 2001, XP007128932, ISSN: 0374-4353.
(Continued)

*Primary Examiner* — Dwayne Bost
*Assistant Examiner* — Larry Sternbane
(74) *Attorney, Agent, or Firm* — Howard Seo

(57) ABSTRACT

Techniques for managing resources at a wireless device are described. In one aspect, the wireless device controls applications based on resource demands and available resources. Processing demands by the applications may be monitored, and at least one of the applications may be controlled based on the processing demands and a maximum processing capacity of a processing unit executing the applications. A data application may be controlled by reducing the amount of data exchanged by the application when high processing demands are detected, and vice versa. In another aspect, the wireless device varies resource capacity to match resources demands. The processing capacity of the processing unit may be adjusted based on the processing demands. Higher clock frequency may be selected for the processing unit when the processing demands exceed a high threshold, and lower clock frequency may be selected when processing demands fall below a low threshold.

50 Claims, 7 Drawing Sheets

(51) Int. Cl.

| | | |
|---|---|---|
| *G01R 31/08* | (2006.01) | |
| *G06F 11/00* | (2006.01) | |
| *G08C 15/00* | (2006.01) | |
| *H04J 1/16* | (2006.01) | |
| *H04J 3/14* | (2006.01) | |
| *H04L 1/00* | (2006.01) | |
| *H04L 12/26* | (2006.01) | |
| *G06F 9/50* | (2006.01) | |
| *H04L 12/801* | (2013.01) | |
| *H04L 5/14* | (2006.01) | |
| *H04W 28/12* | (2009.01) | |
| *H04M 11/06* | (2006.01) | |

(56) References Cited

U.S. PATENT DOCUMENTS

| | | | | |
|---|---|---|---|---|
| 6,278,691 | B1* | 8/2001 | Ohyama et al. | 370/235 |
| 6,594,699 | B1* | 7/2003 | Sahai et al. | 709/228 |
| 6,643,259 | B1* | 11/2003 | Borella et al. | 370/231 |
| 7,289,452 | B2* | 10/2007 | Malkamaki | 370/252 |
| 7,321,556 | B1* | 1/2008 | Parekh et al. | 370/232 |
| 7,610,377 | B2 | 10/2009 | Petit | 709/225 |
| 7,640,449 | B2* | 12/2009 | Ham | 713/501 |
| 2003/0103460 | A1 | 6/2003 | Kamath et al. | |
| 2003/0186724 | A1* | 10/2003 | Tsutsumi et al. | 455/561 |
| 2004/0047331 | A1 | 3/2004 | Jang | |
| 2005/0157696 | A1* | 7/2005 | Yamamoto | 370/349 |
| 2005/0259662 | A1* | 11/2005 | Kim et al. | 370/395.4 |
| 2005/0268014 | A1 | 12/2005 | Geib et al. | |
| 2006/0205517 | A1 | 9/2006 | Malabuyo et al. | |
| 2007/0014363 | A1* | 1/2007 | Golas et al. | 375/240.16 |
| 2008/0317017 | A1* | 12/2008 | Wiemann et al. | 370/389 |

FOREIGN PATENT DOCUMENTS

| | | |
|---|---|---|
| CN | 1622081 A | 6/2005 |
| CN | 1722725 A | 1/2006 |
| EP | 1376372 | 1/2004 |
| JP | 1196633 A | 8/1989 |
| JP | 8050551 A | 2/1996 |
| JP | 10097435 A | 4/1998 |
| JP | 10177489 A | 6/1998 |
| RU | 2263409 | 10/2005 |
| RU | 2280958 | 7/2006 |
| WO | 9715149 | 4/1997 |
| WO | WO0103421 A1 | 1/2001 |
| WO | 0219697 | 3/2002 |
| WO | 03051078 | 6/2003 |
| WO | WO03047206 A1 | 6/2003 |
| WO | WO2005062550 | 7/2005 |
| WO | WO2006024320 A1 | 3/2006 |

OTHER PUBLICATIONS

International Search Report—PCT/US07/080003, International Search Authority—European Patent Office—Apr. 29, 2008.

Written Opinion—PCT/US07/080003, International Search Authority—European Patent Office—Apr. 29, 2008.

Kanemitsu, Kyouji, et al. "Investigation of QoS control on real-time OS, Multiple processing mode and QoS control support function by real-time OS." The Special Interest Group Notes of IPSJ, vol. 2003, No. 28, IPSJ, Mar. 11, 2003, pp. 35-40, ISSN: 0919-6072.

Taiwan Search Report—TW096136665—TIPO—Jul. 31, 2011.

Harada F., et al., "Power-Aware Optimization of CPU and Frequency Allocation Based on Fairness of QoS," IEICE Transactions, Japan, The Institute of Electronics, Information and Communication Engineers, Sep. 1, 2006, vol. J89-D, No. 9, pp. 1954-1962, ISSN: 1880-4535.

Nakamura T., et al., "Real-Time Dynamic Frequency Scaling Technique by Feedback Control," Report of the Information Processing Society of Japan, The Information Processing Society of Japan, Mar. 17, 2006, vol. 2006, No. 28 (2006-SLDM-124), pp. 85-90, ISSN: 0919-6072.

Ishikawa N. et al., "2.2 Mobile Internet Protocol," Information Processing, The Information Processing Society of Japan, Dec. 15, 2001, vol. 42, No. 12, pp. 1204-1209, ISSN: 0447-8053.

Special Topic 1: Reintroduction to TCP/IP (Full-Illustration), Mechanism for Securing Reliability, Network Magazine, ASCII Corporation, Dec. 1, 2002, vol. 7, No. 12, pp. 80-83.

Takeshita T. et al., "Introduction to Mastering TCP/IP," 2nd ed., Ohmsha Ltd., May 25, 1998, pp. 184-189, ISBN: 4-274-06257-0.

\* cited by examiner

METHOD AND APPARATUS FOR MANAGING RESOURCES AT A WIRELESS DEVICE

The present application claims priority to provisional U.S. Application Ser. No. 60/827,678, entitled "GRACEFULLY REDUCE APPLICATION(S) PERFORMANCE WHEN MIPS DEMAND EXCEEDS ARCHITECTURAL CAPABILITY OF CHIPSET," filed Sep. 29, 2006, assigned to the assignee hereof and incorporated herein by reference.

BACKGROUND

I. Field

The present disclosure relates generally to electronics, and more specifically to techniques for managing resources at a wireless device.

II. Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc.

A wireless device (e.g., a cellular phone) may actively communicate with a wireless network for one or more services, e.g., voice and/or packet data. The wireless device may expend processing resources to process data for communication with the wireless network. The wireless device may also have other applications running on the wireless device. Each application may start and terminate at any time and may consume certain amount of processing resources when active. The processing demands at the wireless device may fluctuate widely over time and may be dependent on the amount of data exchanged with the wireless network as well as the specific applications running on the wireless device. If the processing demands exceed the processing capacity of the wireless device, then certain adverse effects may result, which may then cause poor user experience. For example, packets may be dropped and/or an application may malfunction due to insufficient processing resources at the wireless device.

There is therefore a need in the art for techniques to mitigate adverse effects due to processing demands exceeding processing capacity at a wireless device.

SUMMARY

Techniques for managing resources at a wireless device are described herein. In one aspect, the wireless device controls applications based on resource demands and available resources. The applications may be executed by a processing unit having a maximum processing capacity. Processing demands by the applications may be monitored. At least one of the applications may be controlled based on the processing demands and the maximum processing capacity of the processing unit. For example, a data application may be controlled by (i) reducing the amount of data exchanged with a base station when high processing demands are detected or (ii) increasing the amount of data exchanged with the base station when low processing demands are detected. The amount of data exchanged with the base station may be varied, e.g., by adjusting a window size that regulates the number of unacknowledged packets exchanged by the data application.

In another aspect, the wireless device manages different resources at the wireless device to achieve good performance. The wireless device may monitor processing demands, bus demands, memory demands, cache demands, and/or other resource demands by applications for assignable processing resources, bus resources, memory resources, cache resources, and/or other resources, respectively. The wireless device may control at least one application based on the demands by the applications. The wireless device may select the at least one application based on the priorities of the applications, indication on whether each application is controllable or not controllable, etc.

In yet another aspect, the wireless device varies resource capacity to match resources demands. The applications may be executed by a processing unit having configurable processing capacity. Processing demands by the applications may be monitored. The processing capacity of the processing unit may be adjusted based on the processing demands. For example, a higher clock frequency may be selected for the processing unit when the processing demands exceed a high threshold, and a lower clock frequency may be selected when the processing demands fall below a low threshold.

Various aspects and features of the disclosure are described in further detail below.

DETAILED DESCRIPTION

Figure 1:
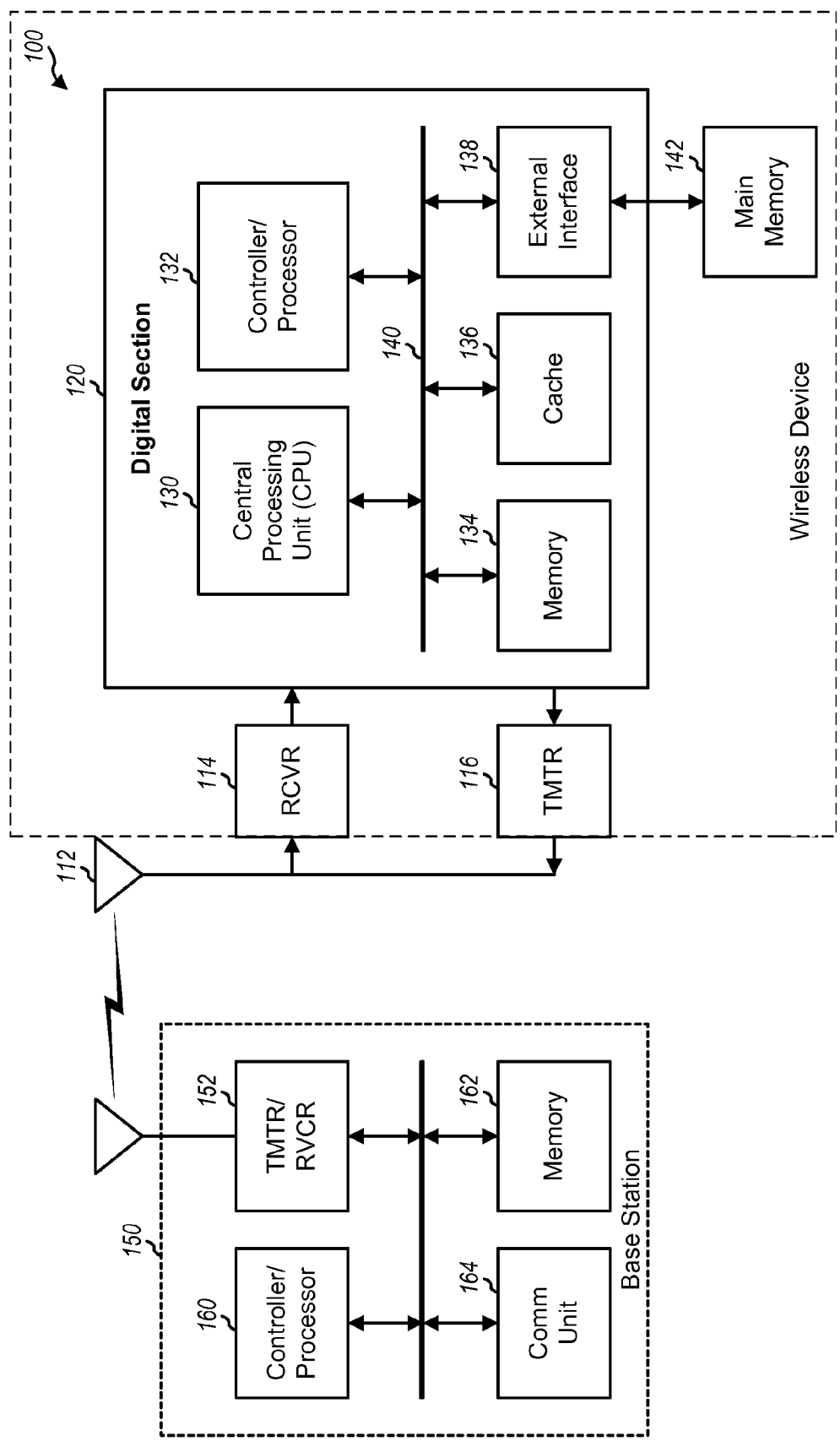
FIG. 1 shows a block diagram of a wireless device and a base station.

FIG. 1 shows a block diagram of a design of a wireless device 100 and a base station 150 in a wireless communication network. Base station 150 may also be referred to as a Node B, an evolved Node B, an access point, a base transceiver station (BTS), etc. In the design shown in FIG. 1, base station 150 includes a transmitter/receiver (TMTR/RCVR) 152 that supports radio communication with wireless devices, a controller/processor 160 that performs various functions for communication with the wireless devices, a memory 162 that stores program codes and data for base station 150, and a communication (Comm) unit 164 that supports communication with other network entities. In general, a base station may include any number of controllers, processors, memories, transmitters, receivers, etc.

Wireless device 100 may also be referred to as a user equipment (UE), a mobile station, a terminal, an access terminal, a mobile equipment, a subscriber unit, a station, etc.

Wireless device 100 may be a cellular phone, a personal digital assistant (PDA), a wireless modem, a handheld device, a laptop computer, etc.

On the receive path, an antenna 112 receives signals transmitted by base station 150, other base stations, satellites, etc., and provides a received signal to a receiver (RCVR) 114. Receiver 114 processes (e.g., filters, amplifies, frequency downconverts, and digitizes) the received signal and provides samples to a digital section 120 for further processing. On the transmit path, digital section 120 processes data to be transmitted and provides data chips to a transmitter (TMTR) 116. Transmitter 116 processes (e.g., converts to analog, filters, amplifies, and frequency upconverts) the data chips and generates a modulated signal, which is transmitted via antenna 112.

Digital section 120 may include various processing, memory, and interface units that support communication with one or more wireless communication networks as well as other applications. In the design shown in FIG. 1, digital section 120 includes a central processing unit (CPU) 130, a controller/processor 132, a memory 134, a cache 136, and an external interface 138, all of which are coupled to a bus 140. CPU 130 may comprise any number of digital signal processors (DSPs), reduced instruction set computer (RISC) processors, general-purpose processors, etc. CPU 130 may perform processing for data transmission (e.g., encoding and modulation), processing for data reception (e.g., demodulation and decoding), and higher-layer processing for data exchanged with a wireless network. CPU 130 may also perform processing for other applications. Controller/processor 132 may direct the operation at wireless device 100 and/or perform other functions. Memory 134 may store data and/or instructions for various units within digital section 120. Cache 136 may provide fast storage of data and/or instructions. Interface unit 138 may interface with other units such as a main memory 142, input/output (I/O) devices, etc. Digital section 120 may be implemented with one or more application specific integrated circuits (ASICs) and/or some other type of integrated circuits (ICs).

In general, wireless device 100 may include fewer, more and/or different processing, memory, and interface units than those shown in FIG. 1. The number of processing units and the types of processing units included in digital section 120 may be dependent on various factors such as the communication networks and applications supported by wireless device 100, cost and power considerations, etc.

Wireless device 100 may support communication with wireless wide area networks (WWANs), wireless local area networks (WLANs), wireless personal area networks (WPANs), broadcast networks, etc. The terms "network" and "system" are often used interchangeably. The WWANs may be CDMA, TDMA, FDMA, OFDMA, SC-FDMA and/or other wireless networks. A CDMA network may implement a radio technology such as Universal Terrestrial Radio Access (UTRA), cdma2000, etc. UTRA includes Wideband-CDMA (W-CDMA) and Time Division-Synchronous CDMA (TD-SCDMA). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.16, IEEE 802.20, Flash-OFDM®, etc. UTRA and E-UTRA are part of Universal Mobile Telecommunication System (UMTS). UTRA, E-UTRA, UMTS, and GSM are described in documents from an organization named "3rd Generation Partnership Project" (3GPP). cdma2000 is described in documents from an organization named "3rd Generation Partnership Project 2" (3GPP2). A WLAN may implement a radio technology such as IEEE 802.11, Hiperlan, etc. A WPAN may implement a radio technology such as Bluetooth. A broadcast network may implement a radio technology such as Digital Video Broadcasting for Handhelds (DVB-H), Integrated Services Digital Broadcasting for Terrestrial Television Broadcasting (ISDB-T), MediaFLO, etc. These various networks, radio technologies, and standards are known in the art.

For clarity, the following description assumes that wireless device 100 supports UMTS. 3GPP Release 5 and later supports High-Speed Downlink Packet Access (HSDPA). 3GPP Release 6 and later supports High-Speed Uplink Packet Access (HSUPA). HSDPA and HSUPA are sets of channels and procedures that enable high-speed packet data transmission on the downlink and uplink, respectively.

Wireless device 100 may also support various applications. An application may be a software and/or firmware module that performs a particular function. Different applications may be used for different radio technologies, different features of a given radio technology, etc. For example, wireless device 100 may support applications for HSDPA, HSUPA, WLAN, Bluetooth, MediaFLO, voice, video, video telephony, web browser, email, text editor, graphics applications such as video games, assisted Global Positioning System (A-GPS), etc.

Wireless device 100 may have various types of resources that may be used to support all of the applications running on the wireless device. The resources at wireless device 100 may be categorized as follows:

Processing resources—resources to perform processing for applications, e.g., CPU 130, Memory resources—resources to store data for applications, e.g., memory 134, Cache resources—resources for fast data storage for applications, e.g., cache 136, and Bus resources—resources to transfer data for applications, e.g., bus 140.

The resources at wireless device 100 may be configurable. For example, the processing capacity of wireless device 100 may be varied by adjusting the clock frequency of CPU 130, and the bus capacity may be varied by adjusting the clock frequency of bus 140. Higher CPU and bus clock frequencies may provide more processing and bus resources but may also result in higher power consumption, which may shorten battery life of wireless device 100. In general, it may be desirable to operate at the lowest CPU and bus clock frequencies that can provide sufficient processing and bus resources to meet the demands of all active applications, so that power consumption can be minimized. For memory and cache resources, the amount of available resources may be fixed by design, but these resources may be allocated in different manners to the active applications. For example, an application that is memory intensive may be allocated more cache and/or memory resources than an application that is not memory intensive.

In general, any number of applications and any type of application may be active on wireless device 100 at any given moment. Each active application may have certain resource demands or requirements. The available resources at wireless device 100 may be configured to match the resource demands of all active applications, e.g., by adjusting the CPU and bus clock frequencies. In certain instances, even the highest CPU and bus clock frequencies supported by wireless device 100 may not provide sufficient resources to meet the demands of all active applications. In these instances, one or more of the active applications may be controlled in order to reduce resource demands to conform to the available resources.

Figure 2:
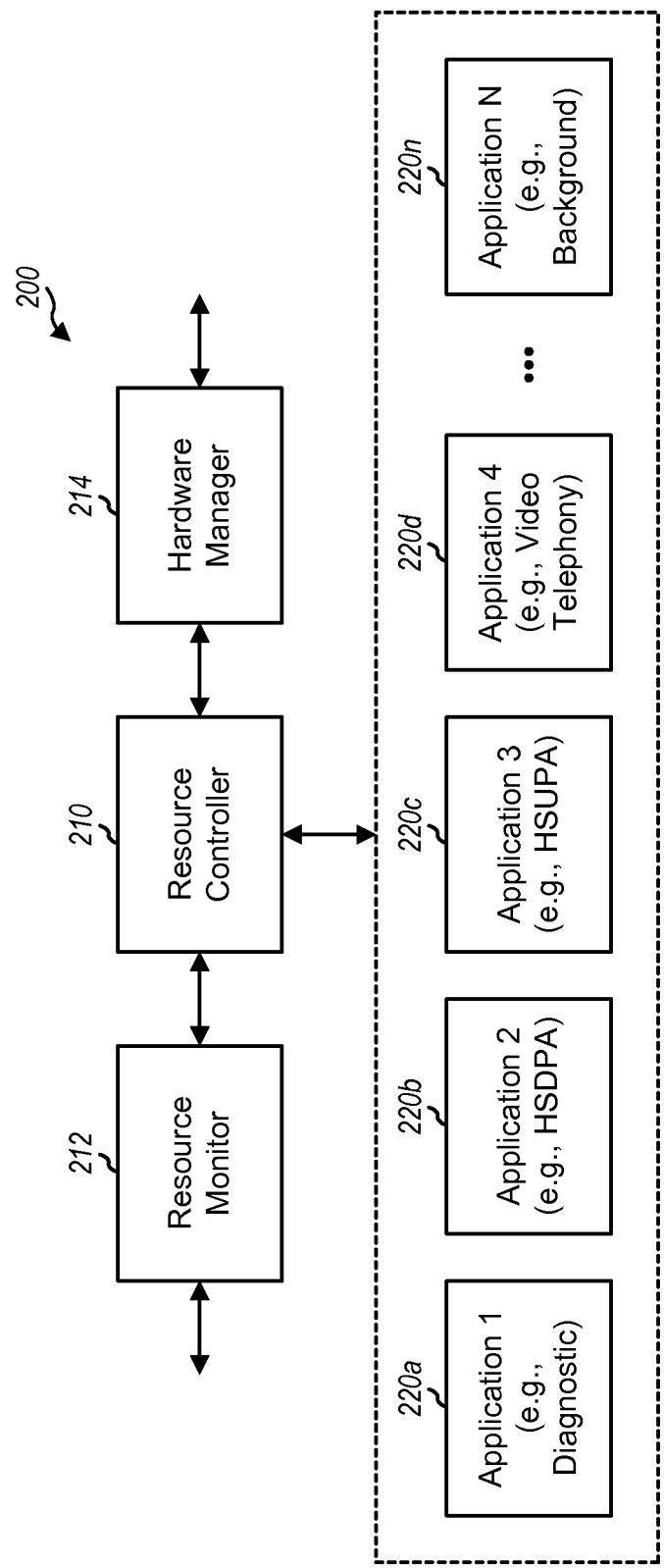
FIG. 2 shows a diagram of a resource management system.

FIG. 2 shows a diagram of a design of a resource management system 200 for wireless device 100. In this design, system 200 includes a resource controller 210, a resource monitor 212, and a hardware manager 214. Modules 210, 212 and 214 may each be implemented with software and/or firmware running on wireless device 100, with hardware implemented within wireless device 100, or with a combination of both.

Resource monitor 212 may determine resource usage by the active applications. For processing resources, resource monitor 212 may count the number of active clock cycles for CPU 130 within a measurement interval. Resource monitor 212 may ascertain the amount of processing resources used by the active applications based on the number of active clock cycles and/or the number of idle clock cycles during the measurement interval. Resource monitor 212 may determine CPU loading, which is the percentage of time that CPU 130 is used during the measurement interval. The CPU loading may be computed based on a ratio of the number of active clock cycles to the total number of clock cycles in the measurement interval. The measurement interval may be selected to provide sufficient averaging as well as to reduce delay in obtaining reports of resource usage. The measurement interval may be 100 milliseconds (ms), 200 ms, etc. Resource monitor 212 may also determine usage of other resources such as bus resources, memory resources, cache resources, etc. Resource monitor 212 may determine resource usage by each active application, by each active application that may be controlled, by each set of active applications to be controlled together, by all active applications, etc.

Hardware manager 214 may control the configuration of various types of resources at wireless device 100. Hardware manager 214 may vary the clock frequency of CPU 130 based on demands for processing resources and/or vary the clock frequency of bus 140 based on the demands for bus resources. Hardware manager 214 may also allocate/reallocate memory 134 and cache 136 based on demands for memory and cache resources, respectively. Hardware manager 214 may receive commands, directives, requests and/or other information from resource controller 210 and may configure the various types of resources accordingly.

Resource controller 210 may attempt to match resource demands of the active applications with the available resources at wireless device 100. Resource controller 210 may obtain pertinent information for each active application, e.g., when the application is activated. The information for each active application may include the following:

Indication on whether the application can be controlled to reduce resource usage, Peak and/or minimum resource requirements of the application, and Priority and/or other characteristics of the application useful for resource management.

A given application may or may not be controlled in order to reduce resource usage when resource demands exceed the available resources. Whether or not the application can be controlled may be dependent on various factors such as the priority of the application, the expected resource usage by the application, etc. If the application can be controlled, then the operation of the application may be adjusted and/or the amount of resources allocated to the application may be varied such that resource demands can be met by the available resources.

The resource requirements of a given application may be given by various parameters such as CPU/bus clock frequencies, number of CPU/bus cycles per unit time, etc. For clarity, processing and bus resources are quantified by CPU/bus clock frequencies in the description below. The peak resource requirements may be used for applications with bursty resource demands that do not need to be sustained for an extended period of the time, e.g., file download. The minimum resource requirements may be used for applications with certain resource demands that may have to be sustained for an extended period of time, e.g., a voice call.

The priority and/or other characteristics of an application may be used to determine when and how to control the application to reduce resource demands. When resource demands exceed the available resources, low priority applications may be controlled first, and high priority applications may be controlled last. Different applications may be controlled in different manners, as described below.

Resource controller 210 may receive resource usage reports that may convey real-time resource usage by the active applications. Resource controller 210 may determine whether to change hardware configuration based on the resource usage. For example, resource controller 210 may direct hardware manager 214 to use lower CPU/bus clock frequencies when the available resources are largely under-utilized. Resource controller 210 may direct hardware manager 214 to use higher CPU/bus clock frequencies when the available resources are insufficient to meet resource demands. Resource controller 210 may also control one or more applications to reduce resource demands if the available resources, even with the highest CPU/bus clock frequencies, are insufficient to meet resource demands. Resource controller 210 may thus control the available resources as well as the resource demands in order to match resource demands with resource supply.

N applications 220a through 220n may be active, where in general N may be any integer value zero or greater. In the example shown in FIG. 2, application 220a may be a diagnostic application, application 220b may be for HSDPA, application 220c may be for HSUPA, application 220d may be for video telephony, and so on, and application 220n may be for background download. Each application 220 may register with resource controller 210 when activated and may provide pertinent information, e.g., as described above. Each active application that can be controlled may receive commands from resource controller 210 to adjust its operation, when appropriate, in order to reduce resource usage. In general, applications 220 may be controlled for any type of resources. For clarity, much of the description below is for control of processing resources, which is also referred to as CPU resources.

CPU 130 may execute applications that support communication with base station 150 as well as other applications running on wireless device 100. Resource controller 210 may control the operation of CPU 130, other resources, and/or the active applications to achieve good performance.

In an aspect, the available resources at wireless device 100 may be adjusted based on resources demands by the active applications. For example, the CPU loading may be monitored in real time, and the CPU clock frequency may be adjusted based on the CPU loading. In one design, the CPU loading may be compared against a high threshold and a low threshold. A higher CPU clock frequency (if available) may be selected when the CPU loading exceeds the high threshold. A lower CPU clock frequency (if available) may be selected when the CPU loading falls below the low threshold.

In another aspect, the active applications may be controlled, if needed, so that the resource demands can be met by the available resources at wireless device 100. The resource demands may be ascertained through real-time monitoring. The available resources may be increased or decreased, e.g., by selecting different clock frequencies, based on the resource demands. However, when the available resources reach maximum capacity, the active applications may be controlled to reduce the resource demands to be below the available resources.

For example, if CPU 130 operates with CPU loading above the high threshold, then resource controller 210 may take actions to correct this condition. Resource controller 210 may adjust/throttle the downlink transmission from base station 150 and/or the uplink transmission from wireless device 100 based on CPU loading. Alternatively or additionally, resource controller 210 may direct a reduction of performance of one or more other active applications running on wireless device 100. For example, resource controller 210 may direct a background application (e.g., a download program) to operate at a lower speed to reduce CPU demands, which may then free up CPU resources for a higher priority application (e.g., a voice call). Alternatively, resource controller 210 may temporary halt or terminate the background application. In any case, controlling the background application may not compromise the quality of service (QoS) of higher priority applications.

Figure 3:
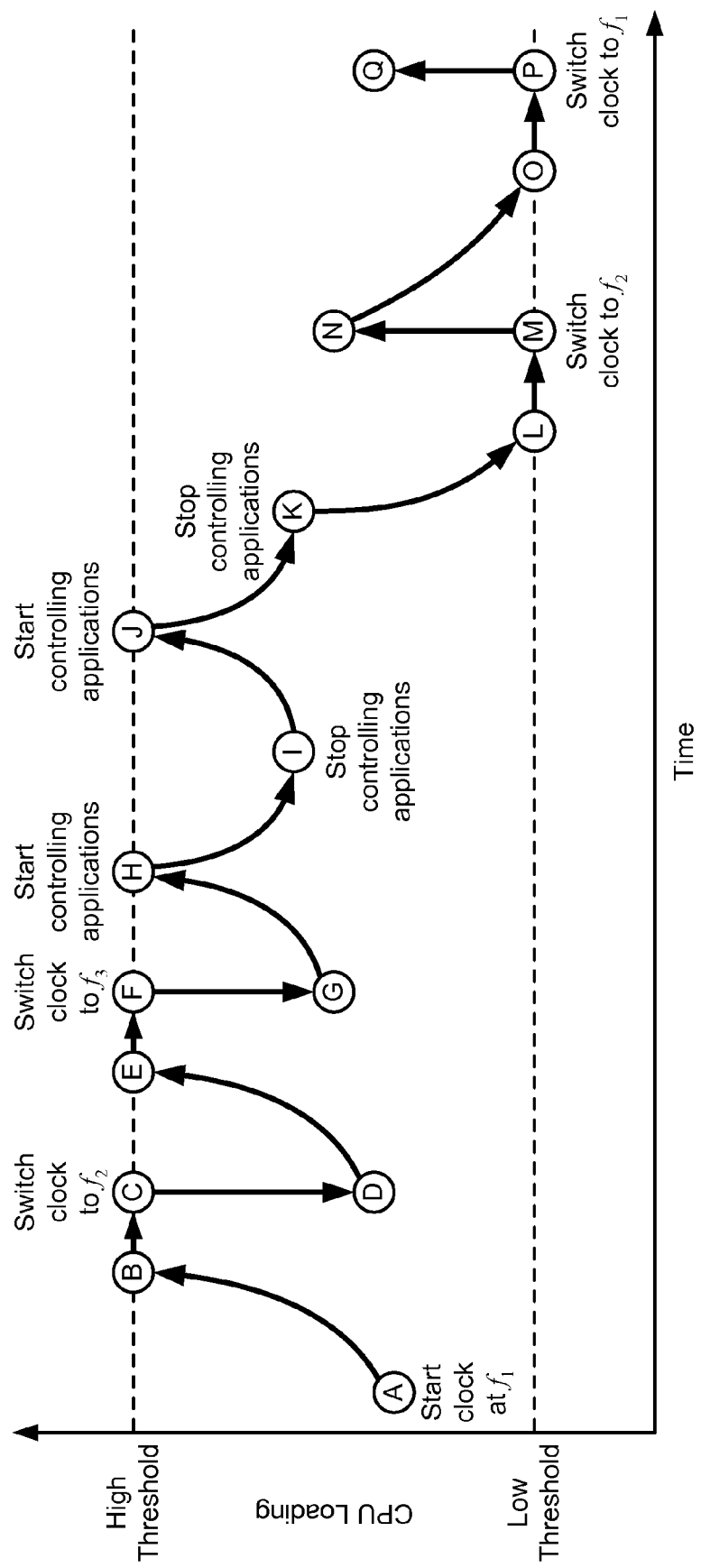
FIG. 3 shows adjustment of CPU clock frequency based on CPU usage.

FIG. 3 shows an example of adjusting CPU clock frequency based on CPU demands by the active applications. In this example, three CPU clock frequencies $f_1$, $f_2$ and $f_3$ are supported, with $f_1 < f_2 < f_3$. The maximum CPU capacity is achieved with the highest clock frequency $f_3$.

CPU 130 initially operates with the lowest clock frequency $f_1$ at A. The CPU loading increases due to higher demands by the active applications and reaches the high threshold at B. The CPU clock frequency is switched from $f_1$ to $f_2$ at C, and the CPU loading drops at D due to more CPU capacity with the higher clock frequency $f_2$. The CPU loading increases again due to higher demands and reaches the high threshold at E. The CPU clock frequency is switched from $f_2$ to $f_3$ at F, and the CPU loading drops at G due to more CPU capacity with the higher clock frequency $f_3$. The CPU loading increases again due to higher demands and reaches the high threshold at H.

Since the highest CPU clock frequency $f_3$ is already selected, resource controller 210 starts controlling the active applications in order to reduce resource demands. The CPU loading decreases in response to controlling of the active applications. Resource controller 210 stops controlling the applications when the CPU loading reaches an acceptable level at I. The CPU loading thereafter increases again due to higher demands and reaches the high threshold at J. Resource controller 210 starts controlling the active applications, and the CPU loading decreases in response. Resource controller 210 stops controlling the applications when the CPU loading reaches an acceptable level at K.

The CPU loading thereafter decreases due to lower demands by the active applications and reaches a low threshold at L. After a predetermined time period in which the demands are at or below the low threshold, the CPU clock frequency is switched from $f_3$ down to $f_2$ at M. The CPU loading increases at N due to less CPU capacity with the lower clock frequency $f_2$. The CPU loading decreases again due to lower demands and reaches the low threshold at O. After the predetermined time period, the CPU clock frequency is switched from $f_2$ down to $f_1$ at P, and the CPU loading increases at Q due to less CPU capacity with the lowest clock frequency $f_1$.

In the design shown in FIG. 3, two thresholds are used to adjust the CPU clock frequency and control the active applications. The same high and low thresholds may be used for all CPU clock frequencies, as shown in FIG. 3. Alternatively, a different set of high and low thresholds may be used for each CPU clock frequency and may be selected based on the CPU capacity for that clock frequency. In another design, more than two thresholds are used to adjust the CPU clock frequency and/or control the active applications. The same thresholds may be used for all active applications. Alternatively, different active applications may have different sets of thresholds. Each active application may be controlled based on CPU loading relative to the set of thresholds applicable for that application.

FIG. 3 shows adjustment of CPU clock frequency to vary the CPU capacity based on CPU demands. Other resources such as bus resources may be controlled in similar manner.

Figure 4:
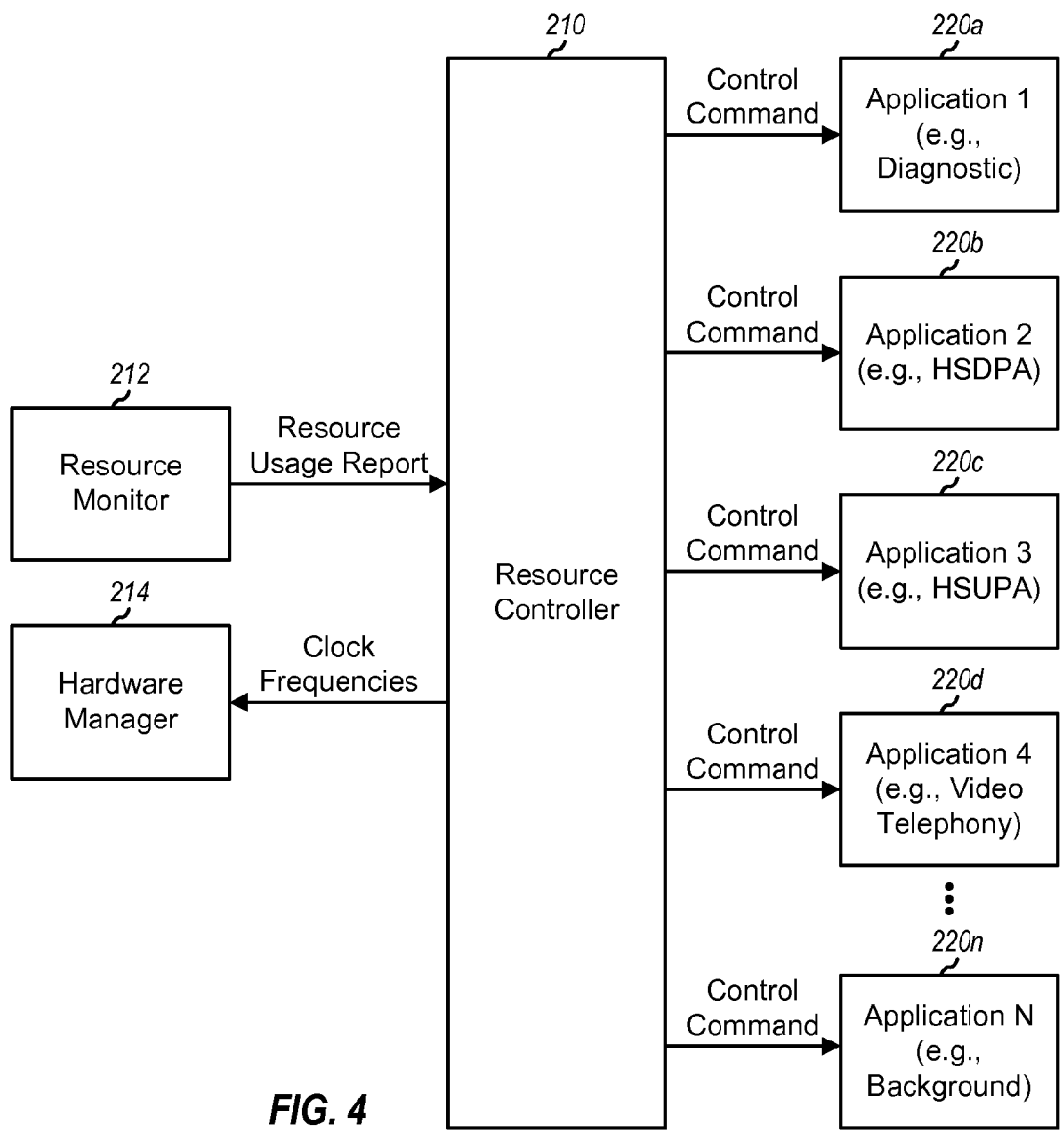
FIG. 4 shows interaction between modules in the resource management system.

FIG. 4 shows the interaction between resource controller 210, resource monitor 212, hardware manager 214, and applications 220a through 220n in FIG. 2. Resource controller 210 may receive resource usage reports from resource monitor 212. Each resource usage report may indicate CPU loading and/or usage of other resources at wireless device 100. Resource controller 210 may determine whether the available resources are sufficient to meet the resource demands of the active applications. Resource controller 210 may send hardware commands (e.g., for lower or higher clock frequencies) to hardware manager 214, which may then set the hardware configuration to vary resource capacity. Resource controller 210 may also send control commands to each individual active application 220, as needed, to control resource demands by the application.

Resource controller 210 may select the active applications for control in various manners. In one design, resource controller 210 selects active applications for control based on their priorities as well as indications on whether or not these applications can be controlled. Resource controller 210 may select and control an application with the lowest priority first, then an application with the second lowest priority next, and so on, and then an application with the highest priority last. For example, resource controller 210 may select applications in the following order:

Diagnostic and other applications that are unrelated to any services being received, Background and delay-tolerant applications, e.g., data download, and Interactive and delay-sensitive applications, e.g., video telephony.

In certain instances, controlling the diagnostic application alone may reduce resource demands by a sufficient amount. If controlling the diagnostic application is not sufficient, then background applications may be controlled next, and interactive applications may be controlled as a last resort. This order may reduce impact to user experience.

In another design, resource controller 210 selects active applications for control based on their QoS requirements, if any. Resource controller 210 may select applications with no QoS requirements first, then applications with less stringent QoS requirements next, and so on, and applications with the most stringent QoS requirements last. Resource controller 210 may allocate sufficient resources to each active application to meet its QoS requirements. Resource controller 210 may allocate minimum or no resources to active applications without any QoS requirements when resource demands exceed the available resources.

In UMTS, a call may have one or more radio access bearers (RABs) to transport traffic data and one or more signaling radio bearers (SRBs) to transport signaling. Each RAB may be considered as a separate data flow having certain characteristics. Each RAB may carry traffic data for a particular class such as conversational, streaming, interactive, or background. In one design, the SRBs are not controlled. RABs carrying interactive and background classes may be controlled first, e.g., equally among these RABs. RABs carrying conversational and streaming classes may be controlled next, e.g., equally among these RABs. This design may ensure that data flows are controlled in an order based on their priorities, as determined by their traffic classes. In general, lower priority data flows may be controlled first, and higher priority data flows may be controlled next, e.g., after the lower priority data flows have been fully controlled.

Resource controller 210 may control different applications in different manners. For the diagnostic application, resource controller 210 may control the type of messages and/or events to report by the application, or may disable the application. For background applications, resource controller 210 may reduce the amount of resources (e.g., CPU speed) allocated to these applications, reduce the data rates on the downlink and/or uplink, temporarily halt the applications, etc. For interactive applications, resource controller 210 may reduce the data rate, frame rate, etc.

Resource controller 210 may also apply conditional rules to select active applications for control and/or to control the selected applications. A conditional rule is a rule to be applied when one or more predetermined conditions occur. For example, resource controller 210 may vary the downlink data rate for HSDPA in similar manner as the uplink data rate for HSUPA.

In one design, resource monitor 212 determines the CPU loading (e.g., periodically in each measurement interval), compares the CPU loading against a set of thresholds, and sends a report to resource controller 210 whenever the CPU loading crosses a threshold. This design may reduce the number of reports sent by resource monitor 212 to resource controller 210.

Figure 5:
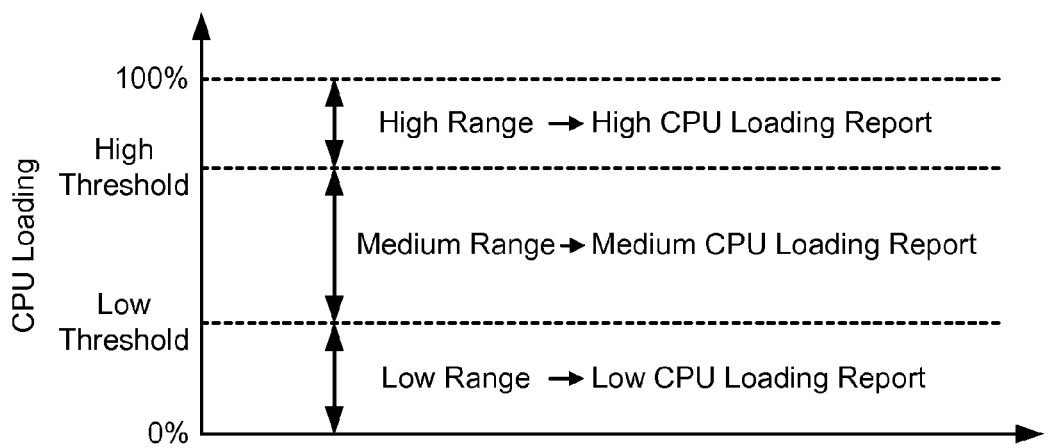
FIG. 5 shows reporting of CPU loading with two thresholds.

FIG. 5 shows a design for reporting CPU loading with two thresholds—a high threshold and a low threshold. The CPU loading may be in one of three possible ranges:

Off range—covers 0% loading to the low threshold,
Medium range—covers the low threshold to the high threshold, and
High range—covers the high threshold to 100% loading.

The three ranges may also be referred to as CPU states. Resource monitor 212 may send a low CPU loading report whenever the CPU loading transitions to the low range, send a medium CPU loading report whenever the CPU loading transitions to the medium range, and send a high CPU loading report whenever the CPU loading transitions to the high range.

In one design, the same high and low thresholds are used for all active applications. In this design, resource controller 210 may receive low, medium, and high CPU loading reports from resource monitor 212 and may control the active applications, as necessary. In another design, a different set of high and low thresholds may be used for each active application. In this design, resource monitor 212 may generate low, medium, and high CPU loading reports for each application based on the set of thresholds for that application. Resource controller 210 may control each application based on the low, medium, and high CPU loading reports received for that application. The high threshold may be set to a value between 90% and 100%. The low threshold may be set to a value between 80% and 90%. The high and low thresholds may also be set to other values.

Each application may be controlled in a manner that is appropriate for that application. Data applications such as HSDPA and HSUPA may be controlled in various manners, as described below.

For HSDPA, base station 150 may send data to one or more users on a high-speed downlink shared channel (HS-DSCH) in each 2 ms transmission time interval (TTI). The HS-DSCH is shared by all users via time and code division multiplexing. Each user periodically transmits a channel quality indicator (CQI) that conveys the downlink channel quality observed by that user. Base station 150 receives the CQIs from all users and uses the CQI information to (i) select one or more users for downlink transmission in the next TTI and (ii) select a data rate for each scheduled user. In general, more data may be sent to users observing high downlink channel quality.

For HSDPA, base station 150 sends data in protocol data units (PDUs) using Radio Link Protocol (RLC) at a link layer. An RLC PDU is also referred to as a PDU or a packet in the description below. Each PDU may be 40 bytes, 80 bytes, etc. For RLC, a transmitter sends PDUs to a receiver, with each PDU being identified by a sequence number that is incremented whenever a new PDU is sent. The receiver decodes each received PDU and sends an acknowledgement (ACK) if the PDU is decoded correctly. To improve throughput, the transmitter may send new PDUs without waiting for ACKs for previously sent PDUs. An RLC window determines the maximum number of outstanding PDUs without ACKs, as seen from the transmitter. If N denotes the highest numbered unacknowledged PDU, which is the start of the RLC window, and W indicates the RLC window size, then the highest sequence number that may be sent is equal to N+W. The transmitter is not able to send a new PDU unless ACKs have been received for all PDUs sent prior to the start of the RLC window. The RLC window may vary in size and may cover 1 to 2047 PDUs. The RLC window size for HSDPA may be controlled by wireless device 100 by sending a Window command to base station 150. Wireless device 100 may control the amount of data sent by base station 150 to wireless device 100 by selecting an appropriate RLC window size and sending this window size to the base station. By reducing the RLC window, the amount of data may be reduced correspondingly since a smaller RLC window would cause base station 150 to wait for ACKs for prior PDUs before sending new PDUs. For uplink transmission in HSUPA, base station 150 may send a command to wireless device 100 to control the amount of data sent by the wireless device.

In one design, a data application is controlled by adjusting a window size for that data application. The window size may be decreased to reduce the amount of data sent/received by the application, which may then reduce resource demands by the application. Conversely, the window size may be increased to expand the amount of data sent/received by the application, which may then increase resource utilization by the application. The window size adjustment may be used for downlink transmission (e.g., by HSDPA) as well as uplink transmission (e.g., by HSUPA). For the downlink, the selected window size may be sent to base station 150. For the uplink, the transmitter is located at wireless device 100, and the window size may be controlled directly without having to send any commands to base station 150.

The window size for a data application may be controlled based on CPU demands in various manners. In one design, the window size may be varied between a minimum value and a maximum value, which may be selected based on various factors. The window size may be abruptly reduced to the minimum value when a high CPU loading report is received.

This abrupt reduction of the window size may free up resources as quickly as possible, since high priority applications may not be delay tolerant and should be served as quickly as possible. This abrupt reduction may also allow the high threshold to be set aggressively near 100%, which may allow for higher utilization of CPU resources. When CPU demands fall, the window size may be increased gradually in steps. This gradual increase may avoid ping-pong effects (e.g., the window size being toggled between the minimum and maximum values) due to alternating high and low CPU loading reports. While the window is less than the maximum value, the window size may be increased or decreased in steps based on the CPU loading reports. When the window reaches the maximum value, the window size may be reduced abruptly to the minimum value the next time a high CPU loading report is received.

A flag may be used to indicate whether the data application is currently being controlled. The flag may be set to Off initially, then switched from Off to On when a high CPU loading report is received and the flag is Off, and switched from On back to Off when the window size is set to the maximum value with the flag being On. The window size for the data application may be reduced to the minimum value when a high CPU loading report is received and the flag is set to Off. If the flag is set to On when the high CPU loading report is received, then the window size may be reduced by a down step periodically in each update interval until the minimum value is reached. When a low CPU loading report is received, the window size may be increased by an up step periodically until the maximum value is reached. When a medium CPU loading report is received, the window size may be maintained at the current value.

Figure 6:
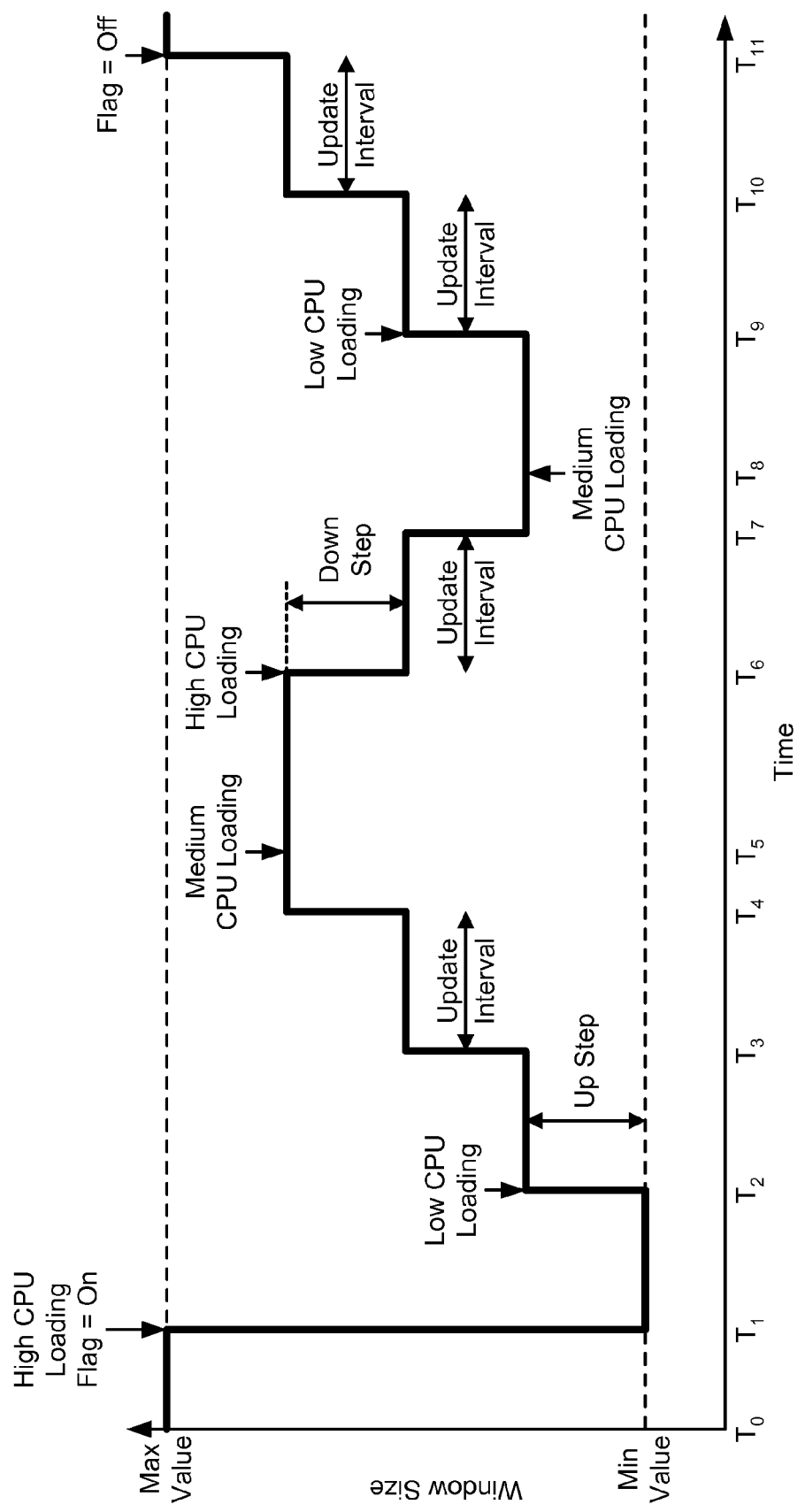
FIG. 6 shows adjustment of a window size based on CPU loading.

FIG. 6 shows an example of window size adjustment for a data application. This example is for the design shown in FIG. 5 with high and low thresholds for CPU loading and low, medium, and high CPU loading reports. At time $T_0$, the flag is Off, and the window size is set to the maximum value. At time $T_1$, a high CPU loading report is received, control of the data application starts, the flag is set to On, and the window size is reduced to the minimum value. A low CPU loading report is received at time $T_2$, and the window size is increased by an up step. The window size is increased by the up step after each update interval, at times $T_3$ and $T_4$.

A medium CPU loading report is received at time $T_5$, and the window size is maintained. A high CPU loading report is received at time $T_6$, and the window size is decreased by a down step since the flag is On. The window size is decreased by the down step after the update interval at time $T_7$. A medium CPU loading report is received at time $T_8$, and the window size is maintained. A low CPU loading report is received at time $T_9$, and the window size is increased by the up step. The window size is increased by the up step after each update interval, at times $T_{10}$ and $T_{11}$. The window size reaches the maximum value at time $T_{11}$, the flag is set to Off, and control of the application terminates.

A timer may be used to increase or decrease the window size when the flag is On. The timer may be started after making a window size adjustment and may count down the update interval. When the timer expires, another window size adjustment may be made, and the timer may be started again. The timer may be paused when a medium CPU loading report is received and may be resumed from the paused value or restarted when a low or high CPU loading report is received.

Parameters such as the minimum and maximum window sizes, the up and down step sizes, and the update interval may be set to appropriate values to achieve the desired performance. The minimum window size may be selected to achieve minimum performance for the data application as well as to avoid adverse effects for other protocols. For example, Transmission Control Protocol (TCP) may time out if no TCP packets are sent and acknowledged within a retransmission timeout (RTO). Whenever a timeout occurs, TCP performs congestion control and reduces data flow, which may take a long time to recover and consequently degrade performance. The minimum window size may be set to a sufficiently large value to ensure that at least one TCP packet can be sent and acknowledged before a TCP timeout occurs. In one design, the minimum window size may be set to 80 PDUs, which may avoid TCP timeout. The maximum window size may be set to the lower of 2047 or a value obtained during call setup or reconfiguration. The up and down step sizes may be set to one quarter of the maximum value, so that the window size can be increased to the maximum value in four update intervals, as shown in FIG. 6. Other up and down step sizes may also be used. The update interval may be set to 200 ms or some other duration.

For a downlink data application (e.g., HSDPA), a window command with the new window size may be sent to base station 150 whenever the window size changes. The window command may be sent multiple times to improve reliability if base station 150 does not send an ACK for the window command. For an uplink data application (e.g., HSUPA), the new window size may be applied at wireless device 100.

A data application may have one or more data flows, and each data flow may correspond to a different RAB. A single window may be maintained for all data flows. Alternatively, a separate window may be maintained for each data flow and may be adjusted based on a set of parameters for that data flow.

FIG. 6 shows a specific design for controlling a data application. A data application may also be controlled in other manners. In another design, the window size is abruptly reduced to the minimum value whenever a high CPU loading is received, regardless of whether the flag is On or Off. In yet another design, more than two thresholds may be used for reporting CPU loading, and more than three different CPU loading reports may be used to control the data application. In this design, the step size may be dependent on the CPU loading report.

In yet another design, a data application is controlled by regulating the amount of data generated by a data source. For example, if data for an uplink data application arrives from a laptop computer connected to wireless device 100 via a Universal Serial Bus (USB), then the laptop computer and/or the USB may be controlled to limit the amount of data received by wireless device 100. As another example, if the data for uplink transmission arrives from a TCP entity in a protocol stack at wireless device 100, then the TCP entity may be controlled to limit the amount of data passed down to lower layers.

In yet another design, a data application is controlled based on CQI feedback. Wireless device 100 may periodically measure the downlink channel quality and send CQI indicative of the measured channel quality. Base station 150 may use the reported CQI to select a data rate for downlink transmission to wireless device 100. When CPU loading is not high or the downlink data application is not controlled, wireless device 100 may send the measured CQI. When CPU loading is high, wireless device 100 may send a CQI that is lower than the measured CQI, which may result in base station 150 selecting a lower data rate and sending less data to wireless device 100. Wireless device 100 may thus send appropriate CQIs to control the amount of data sent by base station 150.

In yet another design, a data application is controlled based on CQI feedback and block error rate (BLER). Base station 150 may send PDUs to wireless device 100. Wireless device 100 may attempt to decode each received PDU and may return an ACK if the PDU is decoded correctly or a negative acknowledgement (NAK) if the PDU is decoded in error. Base station 150 may determine the BLER of the downlink transmission, which is the ratio of the number of PDUs decoded in error to the total number of transmitted PDUs. Base station 150 may select a data rate for downlink transmission based on both the CQI reported by wireless device 100 and the BLER maintained by base station 150. If the BLER is low, e.g., below a target BLER, then base station 150 may add an offset to the reported CQI and select a data rate based on the adjusted CQI. Base station 150 may adjust the CQI offset up or down to achieve the target BLER. The CQI offset added by base station 150 may cancel out the CQI reduction by wireless device 100. To combat the CQI offset added by base station 150, wireless device 100 may send NAKs periodically so that the measured BLER at base station 150 is close to the target BLER, and the CQI offset added by base station 150 is small or zero.

A data application may also be controlled in other manners using other mechanisms. A combination of the designs described above may also be used for a data application. For example, control based on CQI feedback may be implemented first and for a predetermined time duration, and control based on window size adjustment may be triggered after the predetermined time duration. As another example, control based on both CQI feedback and window size adjustment may be performed simultaneously.

Figure 7:
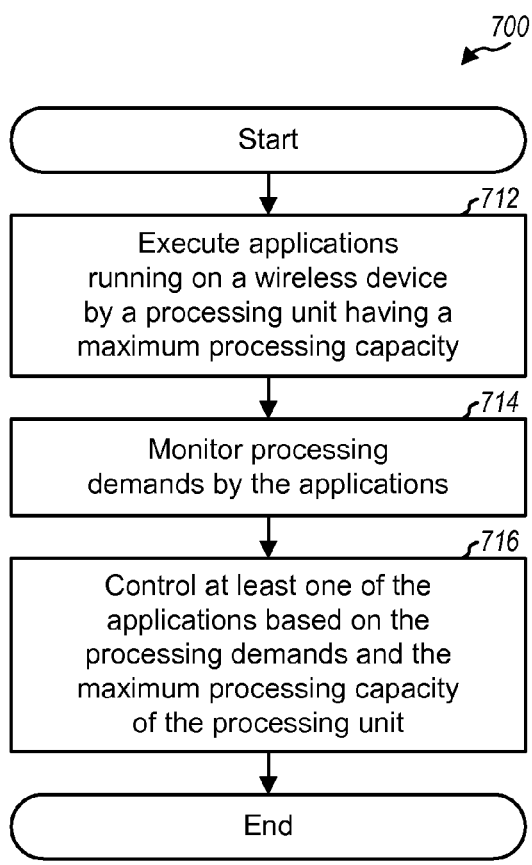
FIG. 7 shows a process to control applications based on resource demands.

FIG. 7 shows a design of a process 700 performed by a wireless device to control applications based on resource demands. Applications running on the wireless device may be executed by a processing unit having a maximum processing capacity (block 712). The processing unit may comprise one or more CPUs, DSPs, general-purpose processors, etc., or any combination thereof. Processing demands by the applications may be monitored by a controller, which may be software and/or hardware on the wireless device (block 714). At least one of the applications may be controlled based on the processing demands and the maximum processing capacity of the processing unit (block 716).

The at least one application may be selected for control from among the applications running on the wireless device based on the priorities of these applications. A low priority application may be controlled first, and a high priority application may be controlled after the low priority application has been fully controlled.

The at least one application to be controlled may include a data application. This data application may be controlled by (i) reducing the amount of data exchanged with (e.g., sent to and/or received from) a base station when high processing demands are detected, or (ii) increasing the amount of data exchanged with the base station when low processing demands are detected. High processing demands may correspond to the processing demands exceeding a high threshold, and low processing demands may correspond to the processing demands falling below a low threshold.

The data application may be controlled by adjusting a window size based on the processing demands and the maximum processing capacity. The window size may regulate the number of unacknowledged packets exchanged by the data application. The window size may be adjusted between a maximum value and a minimum value, where the minimum value may be selected to avoid timeout by TCP and/or other protocol. When high processing demands are detected, the window size may be reduced (i) abruptly to the minimum value if the data application is not yet controlled or (ii) in steps if the data application is being controlled. When low processing demands are detected, the window size may be increased in steps, e.g., one up step in each update interval, up to the maximum value. The window size may be maintained when medium processing demands are detected. For the downlink, the window size may be sent to the base station either once or multiple times to improve reliability. The window size may be used by RLC in HSDPA.

The data application may also be controlled based on CQI feedback. A CQI may be obtained based on downlink channel quality measured at the wireless device for the base station. When high processing demands are detected, the CQI may be reduced, and the reduced CQI may be sent to the base station. NAKs may also be sent for a predetermined percentage of packets received from the base station, even if the packets are decoded correctly, when high processing demands are detected. The data application may also be controlled by varying the transport block size, by modifying buffer status reports sent to the network, etc. The buffer status reports may be modified so that network resources (scheduling information and traffic volume measurements) are not wasted.

Figure 8:
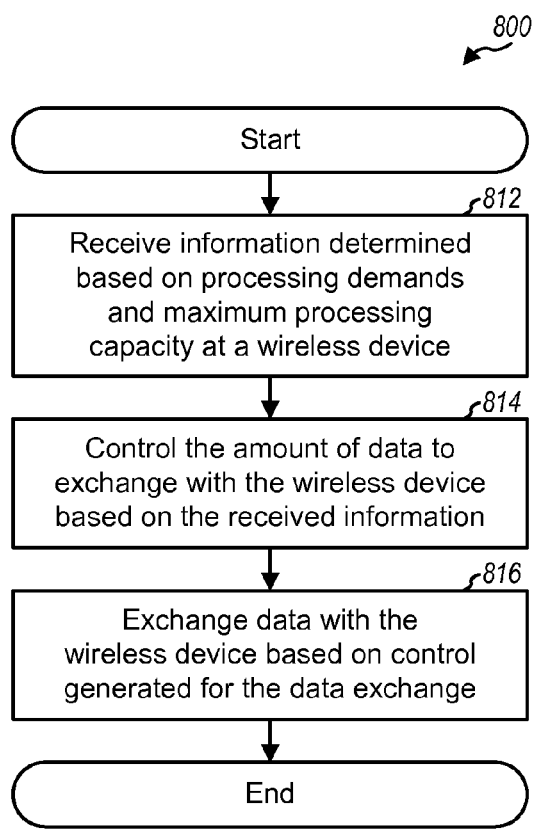
FIG. 8 shows a process performed by the base station.

FIG. 8 shows a design of a process 800 performed by a base station. Information determined based on processing demands and maximum processing capacity at a wireless device is received by the base station (block 812). The amount of data to exchange with the wireless device may be controlled based on the received information (block 814). Data may be exchanged with the wireless device based on control generated for the data exchange (block 816). The information may comprise a window size regulating the number of unacknowledged packets, e.g., the window size used by RLC for HSDPA. Packets may then be sent to the wireless device in accordance with the window size. The information may comprise CQI, and a data rate may be selected for transmission to the wireless device based on the CQI. The information may also comprise CQI and NAKs, and a data rate may be selected for transmission to the wireless device based on the CQI and NAKs. In any case, packets may be sent to the wireless device in accordance with the selected data rate.

Figures 9, 10:
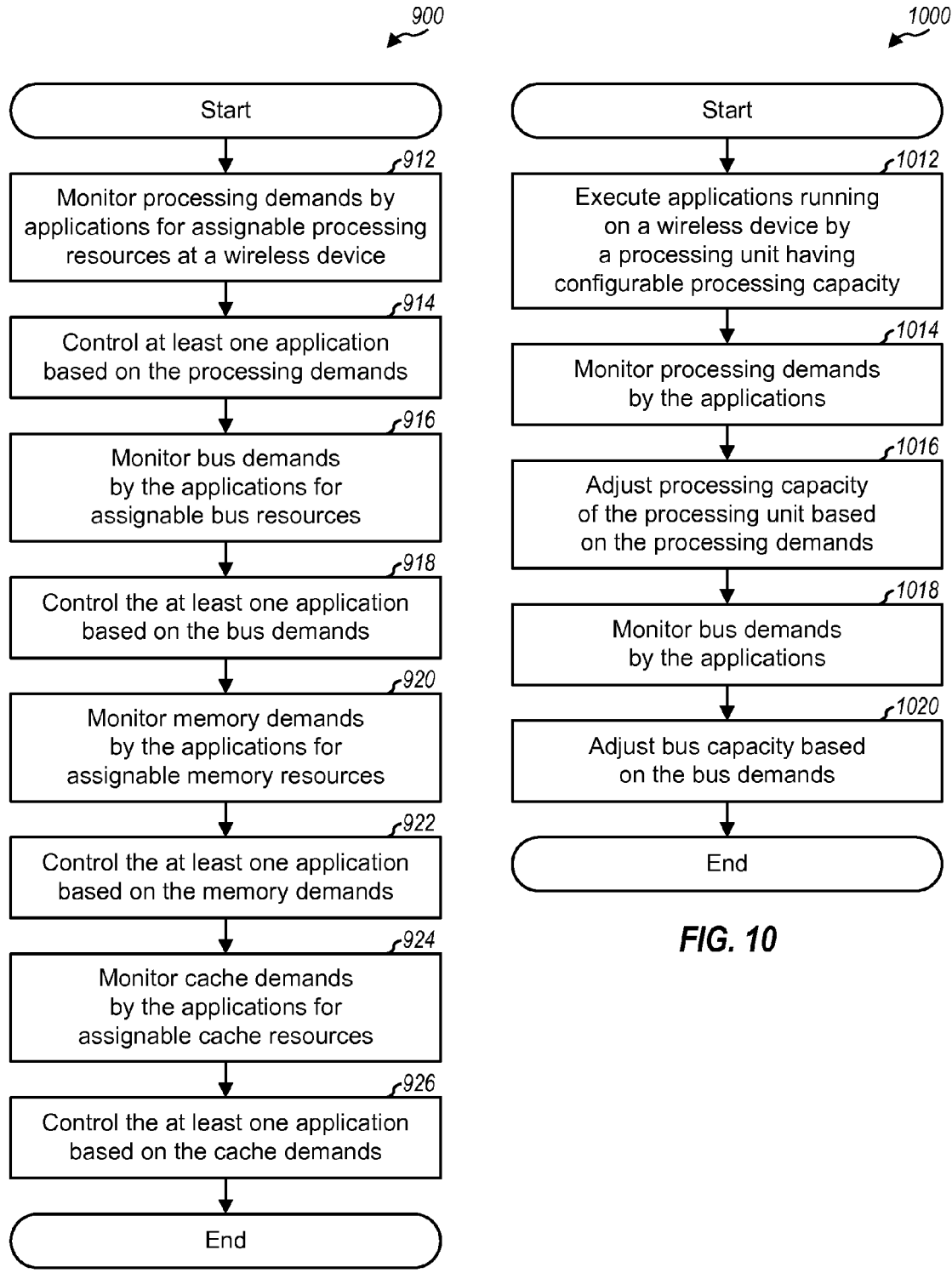
FIG. 9 shows a process to manage different resources at the wireless device.
FIG. 10 shows a process to vary resource capacity to match demands.

FIG. 9 shows a design of a process 900 performed by a wireless device to manage different resources. Processing demands by applications for assignable processing resources at the wireless device may be monitored (block 912). At least one application may be controlled based on the processing demands (block 914). Bus demands by the applications for assignable bus resources may be monitored (block 916). The at least one application may be controlled based on the bus demands (block 918). Memory demands by the applications for assignable memory resources may be monitored (block 920). The at least one application may be controlled based on the memory demands (block 922). Cache demands by the applications for assignable cache resources may be monitored (block 924). The at least one application may be controlled based on the cache demands (block 926). Information on the priorities of the applications running on the wireless device, whether each application is controllable or not controllable, and/or other information may be received, e.g., from the applications. The at least one application may be selected for control based on the received information.

FIG. 10 shows a design of a process 1000 performed by a wireless device to vary resource capacity to match resources demands. Applications running on the wireless device may be executed by a processing unit having configurable processing capacity (block 1012). Processing demands by the applications may be monitored (block 1014). The processing capacity of the processing unit may be adjusted based on the processing demands (block 1016). For example, the clock frequency of the processing unit may be varied to adjust the processing capacity. A higher clock frequency may be selected for the processing unit when the processing demands exceed a high threshold. A lower clock frequency may be selected for the processing unit when the processing demands fall below a low threshold. Bus demands by the applications may be monitored (block 1018). The bus capacity may be adjusted based on the bus demands (block 1020). For example, the clock frequency of the bus may be varied to adjust the bus capacity.

The techniques described herein may be implemented by various means. For example, these techniques may be implemented in hardware, firmware, software, or a combination thereof. For a hardware implementation, the processing units used to perform the techniques at an entity (e.g., a wireless device or a base station) may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, a computer, or a combination thereof.

For a firmware and/or software implementation, the techniques may be implemented with modules (e.g., procedures, functions, etc.) that perform the functions described herein. The firmware and/or software instructions may be stored in a memory (e.g., memory 134 or 162 in FIG. 1) and executed by a processor (e.g., processor 132 or 160). The memory may be implemented within the processor or external to the processor. The firmware and/or software instructions may also be stored in other processor-readable medium such as random access memory (RAM), read-only memory (ROM), non-volatile random access memory (NVRAM), programmable read-only memory (PROM), electrically erasable PROM (EEPROM), FLASH memory, compact disc (CD), magnetic or optical data storage device, etc.

An apparatus implementing the techniques described herein may be a stand-alone unit or may be part of a device. The device may be (i) a stand-alone integrated circuit (IC), (ii) a set of one or more ICs that may include memory ICs for storing data and/or instructions, (iii) an ASIC such as a mobile station modem (MSM), (iv) a module that may be embedded within other devices, (v) a cellular phone, wireless device, handset, or mobile unit, (vi) etc.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A device capable of wireless communication with a base station, comprising:
   a processing unit having a processing capacity and operative to execute one or more applications running on the device; and
   a controller operative to:
   monitor processing demands by the applications and to control at least one of the one or more applications based on the processing demands and the processing capacity;
   adjust a window size for the at least one application based, at least in part, on the monitored processing demands and the processing capacity, the window size regulating a number of unacknowledged packets transmitted between the at least one application and the base station to thereby increase or decrease an amount of data exchanged with the base station responsive to the processing demands and the processing capacity; and
   initiate transmission of an indication of the adjusted window size to the base station.

2. The device of claim 1, wherein the controller is operative to select the at least one application for control from among the applications running on the device based on priorities of the applications.

3. The device of claim 2, wherein the controller is operative to control a low priority application first and to control a high priority application after the low priority application has been fully controlled.

4. The device of claim 1, wherein the at least one application comprises a data application, and wherein the controller is operative to reduce amount of data exchanged by the data application with the base station responsive to detection of high processing demands, and to increase the amount of data exchanged by the data application with the base station responsive to detection of low processing demands.

5. The device of claim 4, wherein high processing demands are detected in response to the processing demands exceeding a high threshold and low processing demands are detected in response to the processing demands not meeting a low threshold.

6. The device of claim 1, wherein the controller is operative to adjust the window size between a maximum value and a minimum value, the minimum value being selected to avoid timeout by Transmission Control Protocol (TCP).

7. The device of claim 1, wherein the controller is operative to reduce the window size responsive to detection of high processing demands.

8. The device of claim 1, wherein the controller is operative to reduce the window size from a maximum value to a minimum value responsive to detection of high processing demands.

9. The device of claim 1, wherein the controller is further operative to reduce the window size from a maximum value to a minimum value responsive to detection of high processing demands while the at least one application is not yet controlled, and to reduce the window size in steps responsive to detection of high processing demands while the at least one application is being controlled.

10. The device of claim 1, wherein the controller is operative to increase the window size in steps, up to a maximum value, responsive to detection of low processing demands.

11. The device of claim 1, wherein the controller is operative to increase the window size by an up step in each update interval, up to a maximum value, in response to detection of low processing demands.

12. The device of claim 1, wherein the controller is operative to maintain the window size responsive to detection of medium processing demands.

13. The device of claim 1, wherein the controller is operative to send the window size to the base station.

14. The device of claim 1, wherein the controller is operative to send the window size to the base station multiple times to improve reliability.

15. The device of claim 1, wherein the controller is operative to reduce size of the window regulating number of unacknowledged protocol data units (PDUs) sent by Radio Link Protocol (RLC) for High-Speed Downlink Packet Access (HSDPA) in response to detection of high processing demands, and to send the window size to the base station.

16. The device of claim 1, wherein the controller is operative to obtain a channel quality indicator (CQI) based on measured channel quality at the device for the base station, to reduce the CQI in response to detection of high processing demands, and to send the reduced CQI to the base station.

17. The device of claim 16, wherein the controller is operative to send negative acknowledgements (NAKs) for a predetermined percentage of packets received from the base station, even if the packets are decoded correctly, responsive to detection of high processing demands.

18. The device of claim 1, wherein the at least one application comprises a data application, and wherein the controller is operative to a transport block size for the data application based on the processing demands.

19. The device of claim 1, wherein the at least one application comprises a data application, and wherein the controller is operative to generate buffer status reports for the data application based, at least in part, on the processing demands, and to send the buffer status reports to the base station.

20. The device of claim 1, wherein the controller is operative to vary clock frequency of the processing unit to adjust the processing capacity.

21. The device of claim 1, wherein the controller is operative to select a higher clock frequency for the processing unit in response to the processing demands exceeding a high threshold, and to select a lower clock frequency for the processing unit in response to the processing demands not meeting a low threshold.

22. The device of claim 1, further comprising: a bus having configurable bus capacity, and wherein the controller is operative to monitor bus demands by the applications and to adjust the bus capacity based, at least in part, on the bus demands.

23. The device of claim 22, wherein the controller is operative to vary clock frequency of the bus to adjust the bus capacity.

24. The device of claim 1, wherein the processing demands are monitored based, at least in part, on a central processor unit (CPU) loading.

25. A method comprising:
monitoring processing demands by one or more applications running on a wireless device for a processing unit having a processing capacity;
controlling at least one of the applications based on the monitored processing demands and the processing capacity by adjusting a window size for the at least one application based, at least in part, on the monitored processing demands and the processing capacity, the window size regulating a number of unacknowledged packets transmitted between the at least one application and a base station to thereby increase or decrease an amount of data exchanged with the base station responsive to the processing demands and processing capacity; and
transmitting an indication of the adjusted window size to the base station.

26. The method of claim 25, wherein the at least one application comprises a data application, and wherein the controlling the at least one application comprises reducing amount of data exchanged by the data application with a base station responsive to detection of high processing demands, and increasing the amount of data exchanged by the data application with the base station responsive to detection of low processing demands.

27. The method of claim 25, wherein the adjusting the window size for the data application comprises reducing the window size responsive to detection of high processing demands, and increasing the window size responsive to detection of low processing demands.

28. The method of claim 25, and further comprising adjusting the processing capacity of the processing unit by selecting a higher clock frequency for the processing unit responsive to the processing demands exceeding a high threshold, and selecting a lower clock frequency for the processing unit responsive to the processing demands not exceeding a low threshold.

29. The method of claim 25, further comprising: monitoring bus demands by the one or more applications for a bus having configurable bus capacity; and adjusting the bus capacity based on the bus demands.

30. The method of claim 25, wherein the processing demands are determined based, at least in part, on a central processor unit (CPU) loading.

31. An apparatus comprising:
means for monitoring processing demands by one or more applications running on a wireless device for a processing unit having a processing capacity;
means for controlling at least one of the applications based on the monitored processing demands and the processing capacity, said means for controlling the at least one application further comprising means for adjusting a window size for the at least one application based, at least in part, on the monitored processing demands and the processing capacity, the window size regulating a number of unacknowledged packets transmitted between the at least one application and a base station to thereby increase or reduce an amount of data exchanged with the base station responsive to the monitored processing demands and the processing capacity; and
means for transmitting an indication of the adjusted window size to the base station.

32. The apparatus of claim 31, wherein the at least one application comprises a data application, and wherein the means for controlling the at least one application comprises means for reducing amount of data exchanged by the data application with the base station in response to detection of high processing demands, and means for increasing the amount of data exchanged by the data application with the base station in response to detection of low processing demands.

33. The apparatus of claim 31, wherein the means for monitoring processing demands comprises means for monitoring processing demands based, at least in part, on a central processor unit (CPU) loading.

34. A tangible, non-transitory processor-readable media for storing instructions which are executable by one or more processors to:
monitor processing demands by one or more applications running on a wireless device for a processing unit having a processing capacity;
control at least one of the applications based on the processing demands and the processing capacity by adjusting a window size for the at least one application based, at least in part, on the monitored processing demands and the processing capacity, the window size regulating a number of unacknowledged packets transmitted between the at least one application and a base station to thereby increase or decrease an amount of data exchanged with the base station responsive to the processing demands and the processing capacity;

reduce the window size from a first value to a second value responsive to detection of high processing demands while the at least one application is not yet controlled; and initiate transmission of an indication of the adjusted window size to the base station.

35. The non-transitory processor-readable media of claim 34, wherein the instructions are further executable by the one or more processors to:

reduce amount of data exchanged by a data application with the base station responsive to detection of high processing demands, the data application being one of the at least one application being controlled, and increase the amount of data exchanged by the data application with the base station responsive to detection of low processing demands.

36. The non-transitory processor-readable media of claim 34, wherein the processing demands are monitored based, at least in part, on a central processor unit (CPU) loading.

37. An apparatus capable of wireless communication with a wireless device, comprising:

a controller operative to receive a window size from the wireless device determined based, at least in part, on processing demands and processing capacity at the wireless device and to control amount of data to exchange with the wireless device based, at least in part, on the received window size; and a processor operative to exchange data with the wireless device based on control from the controller, wherein the window size regulates a number of unacknowledged packets transmitted between at least one application running on the wireless device and the apparatus to thereby increase or reduce an amount of data exchanged between the at least one application and the apparatus responsive to the processing demands and the processing capacity.

38. The apparatus of claim 37, wherein the window size regulates a number of unacknowledged protocol data units (PDUs) sent by Radio Link Protocol (RLC) for High-Speed Downlink Packet Access (HSDPA), and wherein the processor is operative to send PDUs to the wireless device in accordance with the window size.

39. The apparatus of claim 37, wherein the controller is further operative to receive a channel quality indicator (CQI), wherein the controller is operative to select a data rate for transmission to the wireless device based on the CQI, and wherein the processor is operative to send packets to the wireless device in accordance with the selected data rate.

40. The apparatus of claim 37, wherein the processing demands and the processing capacity are based, at least in part, on a central processor unit (CPU) loading.

41. A method comprising:

receiving a window size determined based, at least in part, on processing demands and a processing capacity at a wireless device;

controlling amount of data to exchange with the wireless device based on the received information, wherein the window size regulates a number of unacknowledged packets exchanged with at least one application running on the wireless device and the apparatus to thereby increase or reduce an amount of data exchanged with the at least one application responsive to the processing demands and the processing capacity; and reducing the window size from a first value to a second value responsive to detection of high processing demands while the at least one application is not yet controlled.

42. A device capable of wireless communication with a base station, comprising:

processing resources assignable to one or more applications running on the device, the processing resources having a processing capacity;

a controller operative to monitor processing demands by the one or more applications for the assignable processing resources and to control at least one of the applications by adjusting a window size for the at least one application based, at least in part, on the processing demands and the processing capacity, the window size regulating a number of unacknowledged packets transmitted between the at least one application and a base station to thereby increase or reduce an amount of data exchanged with said base station responsive to said processing demands and the processing capacity, the controller being further operative to initiate transmission of an indication of the adjusted window size to the base station.

43. The device of claim 42, further comprising: bus resources assignable to the one or more applications running on the device, and wherein the controller is operative to monitor bus demands by the applications for the assignable bus resources and to control the at least one application based on the bus demands.

44. The device of claim 42, further comprising: memory resources assignable to the applications running on the device, and wherein the controller is operative to monitor memory demands by the applications for the assignable memory resources and to control the at least one application based, at least in part, on the memory demands.

45. The device of claim 42, further comprising: cache resources assignable to the applications running on the device, and wherein the controller is operative to monitor cache demands by the applications for the assignable cache resources and to control the at least one application based, at least in part, on the cache demands.

46. The device of claim 42, wherein the controller is operative to receive information indicating whether each application running on the device is controllable or not controllable, and to select the at least one application for control based, at least in part, on the received information.

47. The device of claim 42, wherein the controller is operative to receive information indicating priorities of the applications running on the device, and to select the at least one application for control based, at least in part, on the received information.

48. A method comprising:

monitoring processing demands by one or more applications running on a wireless device for assignable processing resources at the wireless device;

controlling at least one of the applications based on the monitored processing demands by adjusting a window size for the at least one application based, at least in part, on the monitored processing demands, the window size regulating a number of unacknowledged packets transmitted between the at least one application and a base station to thereby increase or reduce an amount of data exchanged with said base station responsive to the monitored processing demands;

reducing the window size from a first value to a second value responsive to detection of high processing demands while the at least one application is not yet controlled; and transmitting an indication of the reduced window size to the base station.

49. The method of claim 48, further comprising:

monitoring bus demands by the applications for the assignable bus resources at the wireless device; and controlling the at least one application based, at least in part, on the bus demands.

50. The method of claim 48, wherein the processing demands are monitored based, at least in part, on a central processor unit (CPU) loading.

\* \* \* \* \*